United States Patent
Li et al.

(10) Patent No.: US 7,929,292 B2
(45) Date of Patent: Apr. 19, 2011

(54) ELECTRONIC DEVICE WITH HEAT DISSIPATION MECHANISM

(75) Inventors: Xiong Li, Shenzhen (CN); Kim-Yeung Sip, Shenzhen (CN); Shun-Yi Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/630,750

(22) Filed: Dec. 3, 2009

(65) Prior Publication Data

US 2010/0157530 A1    Jun. 24, 2010

(30) Foreign Application Priority Data

Dec. 22, 2008    (CN) .......................... 2008 1 0306414

(51) Int. Cl.
*H05K 7/20* (2006.01)

(52) U.S. Cl. .............. 361/679.46; 361/679.02; 361/688; 361/690; 361/692; 174/16.1; 174/16.2; 165/104.33

(58) Field of Classification Search .................. None
See application file for complete search history.

(56) References Cited

U.S. PATENT DOCUMENTS

| | | | | |
|---|---|---|---|---|
| 5,818,690 A | * | 10/1998 | Spencer | 361/679.09 |
| 6,115,249 A | * | 9/2000 | Cipolla et al. | 361/679.46 |
| 6,256,018 B1 | * | 7/2001 | Zarek | 345/168 |
| 6,414,842 B1 | * | 7/2002 | Cipolla et al. | 361/679.46 |
| 6,496,369 B2 | * | 12/2002 | Nakamura | 361/697 |
| 6,741,456 B2 | * | 5/2004 | Sellers | 361/679.6 |
| 6,744,629 B2 | * | 6/2004 | Hidesawa | 361/679.48 |
| 6,961,240 B2 | * | 11/2005 | Janicek | 361/679.46 |
| 7,652,874 B2 | * | 1/2010 | Loughnanae et al. | 361/679.2 |
| 2008/0253081 A1 | | 10/2008 | Tracy et al. | |

FOREIGN PATENT DOCUMENTS

CN    2627255 Y    7/2004

\* cited by examiner

*Primary Examiner* — Boris L Chervinsky

(74) *Attorney, Agent, or Firm* — Frank R. Niranjan

(57) ABSTRACT

An electronic device with a heat dissipation mechanism includes a main body, at least one supporting member, at least one driving device, a temperature sensor, and a controller. The main body defines a plurality of heat dissipation holes and at least one through hole. The heat dissipation holes are configured for dissipating heat of the electronic device. The supporting member passes through the through hole, and one end of the supporting member protrudes from the bottom of the main body. The driving device is configured for driving the supporting member to move along its axis, causing the electronic device to be kept in a flat state or in an inclined state. The temperature sensor is for sensing the temperature of the electronic device. The controller is for driving the driving device, causing the supporting member to move a predetermined distance along its axis, according to the sensed temperature.

9 Claims, 7 Drawing Sheets

ELECTRONIC DEVICE WITH HEAT DISSIPATION MECHANISM

BACKGROUND

1. Technical Field

The present disclosure relates to electronic devices and, particularly, to an electronic device with a heat dissipation mechanism.

2. Description of Related Art

To better dissipate heat in conventional notebook computers, some external heat dissipating accessories are developed and introduced for notebook computers, which enhance heat dissipation. However, the use of external heat dissipating accessories limits the mobility of notebook computers.

BRIEF DESCRIPTION OF THE DRAWINGS

The components of the drawings are not necessarily drawn to scale, the emphasis instead being placed upon clearly illustrating the principles of an electronic device with a heat dissipation mechanism. Moreover, in the drawings, like reference numerals designate corresponding parts throughout several views.

DETAILED DESCRIPTION

Figure 1:
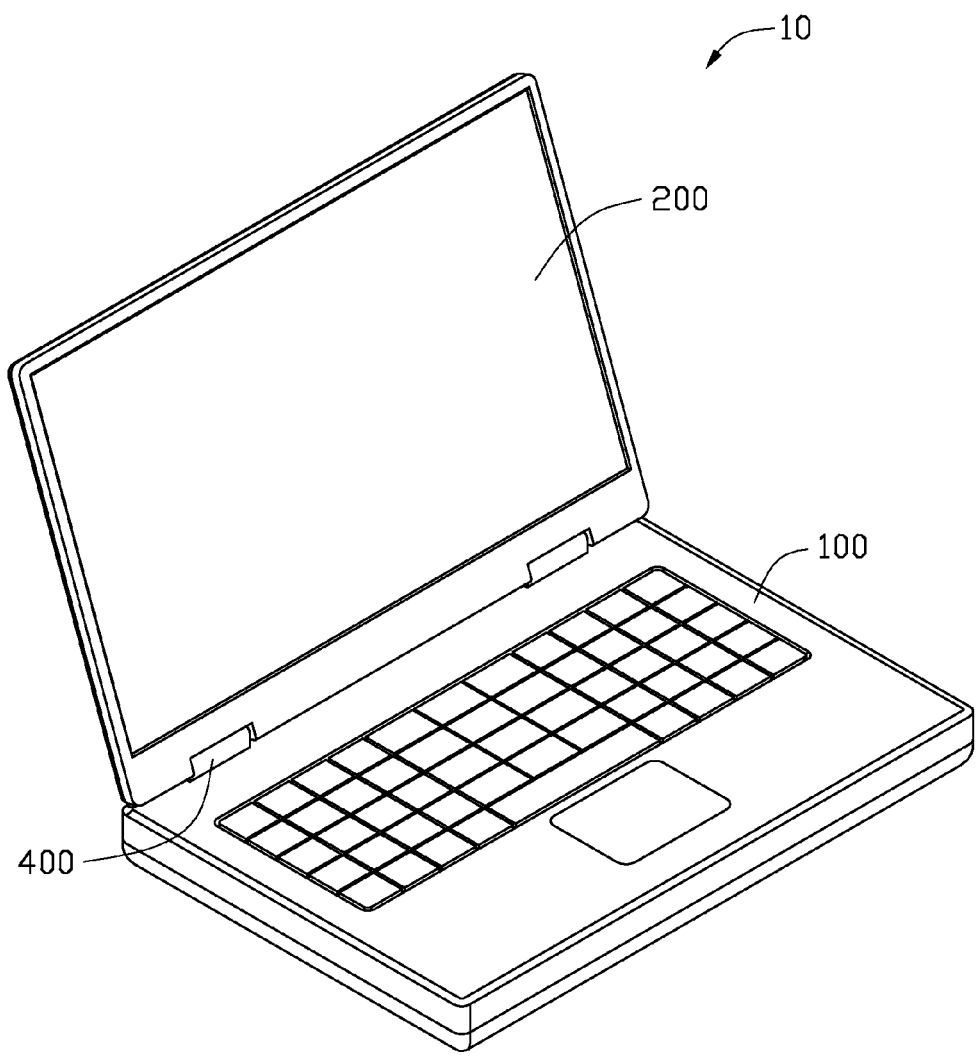
FIG. 1 is an isometric view of an electronic device in accordance with an exemplary embodiment.
Figure 2:
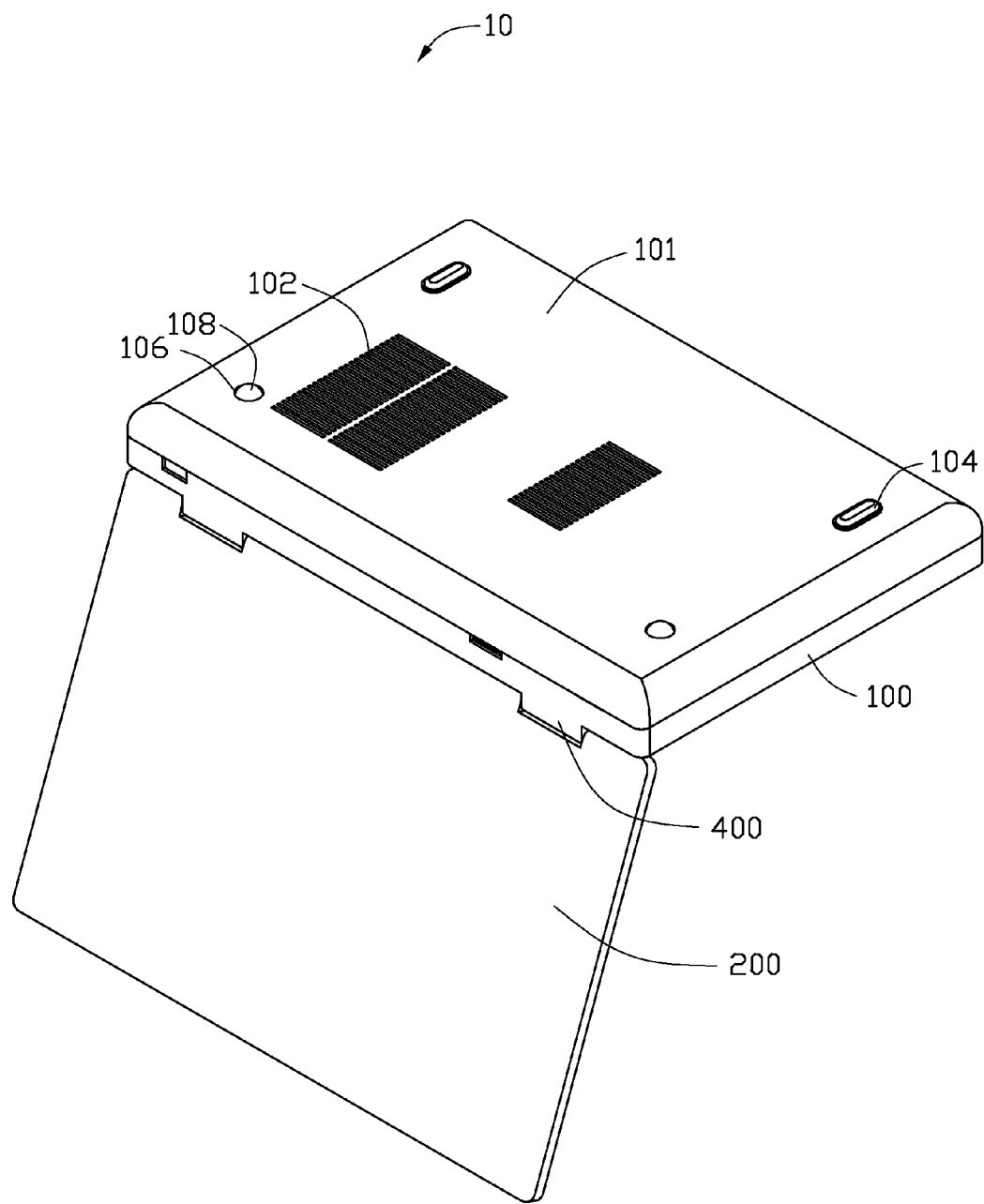
FIG. 2 is an isometric view of the electronic device of FIG. 1, viewed from another perspective.

Referring to FIGS. 1-2, an electronic device 10 includes a main body 100, a cover 200, and two hinges 400. The cover 200 is rotatably coupled to the main body 100 by the hinges 400. The bottom of the main body 100 defines a plurality of heat dissipation holes 102 for dissipating heat. A pair of feet 104 is disposed on the bottom of the main body 100. The feet 104 are spaced from each other, and are far away from the hinges 400. The bottom of the main body 100 further defines a pair of through holes 106. The through holes 106 are spaced from each other, and are formed adjacent to the hinges 400. Each of the through holes 106 receives a supporting member 108. Ends of the supporting members 108 protrude from the bottom of the main body 100, which cooperate with the feet 104 to support the main body 100.

Figure 3:
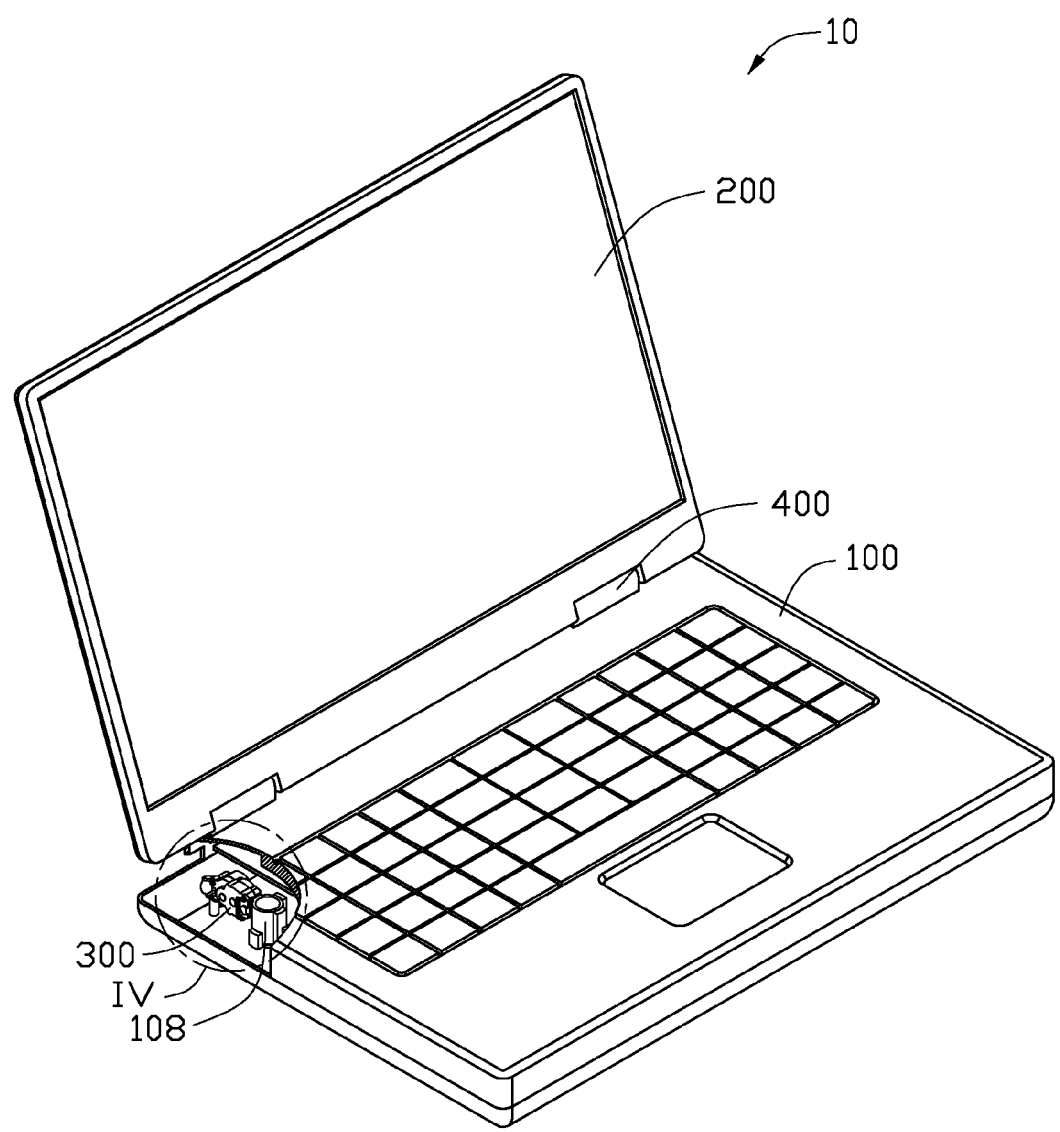
FIG. 3 is a cutaway view of the electronic device of FIG. 1, showing a driving device and a supporting member of the electronic device.
Figure 4:
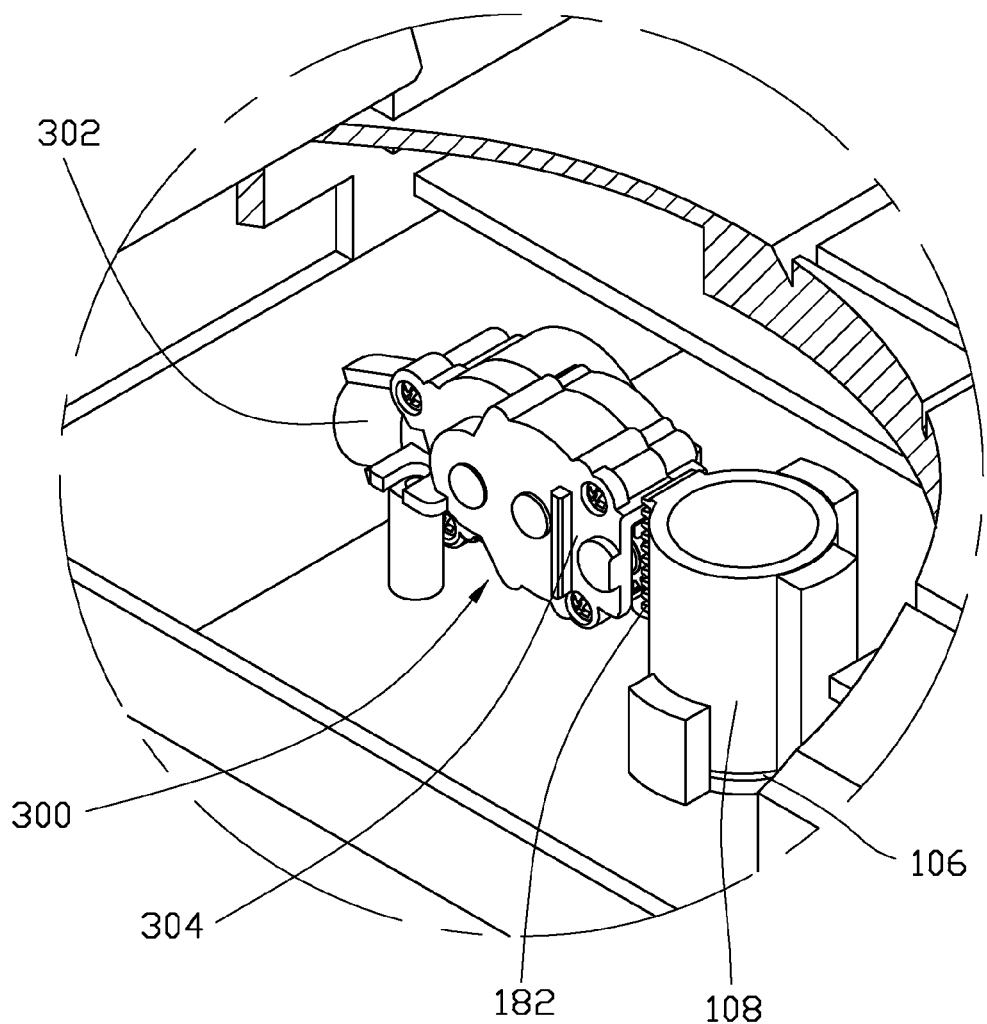
FIG. 4 is an enlarged, cutaway view of the driving device and the supporting member of the electronic device of FIG. 3.

FIGS. 3-4 show the interior structure of the main body 100. In the embodiment, each of the supporting members 108 is driven by a driving device 300. The driving device 300 includes a motor 302 and a transmission device 304. The transmission device 304 is connected to the motor 302 and used to transmit the motion of the motor 302 to the supporting member 108. The transmission device 304 engages the supporting member 108, which converts the rotation of the shaft of the motor 302 into sliding movement of the supporting member 108. In the embodiment, the transmission device 300 is a gear box and the supporting member 108 includes a set of engaging teeth 182 for engaging the gears of the gear box of the transmission device 300.

Figure 5:
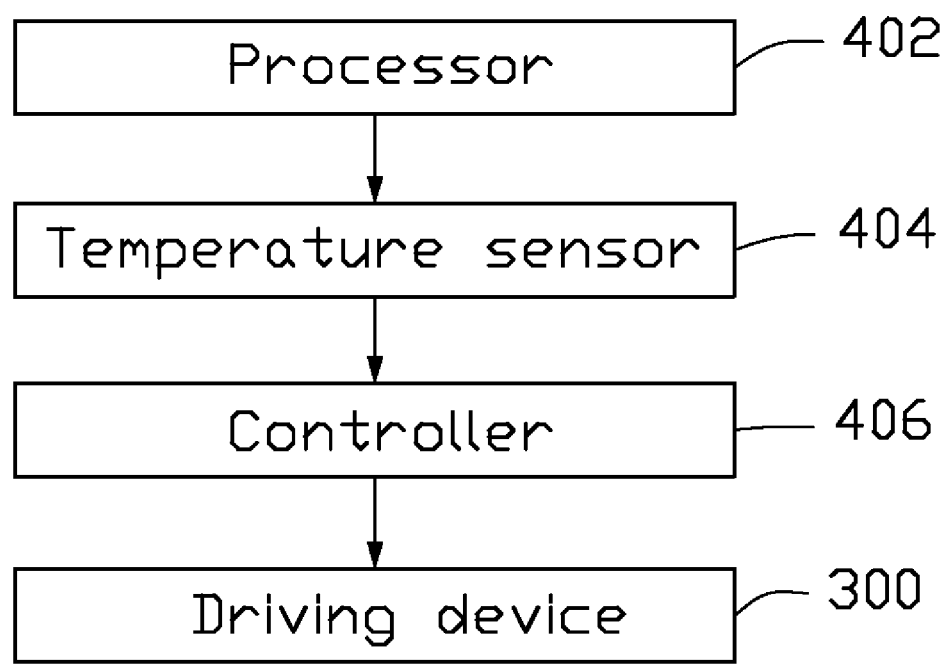
FIG. 5 is a block diagram of the electronic device of FIG. 1.

Referring also to FIG. 5, the electronic device 10 further includes a processor 402, a temperature sensor 404, and a controller 406. The processor 402 is used for driving the electronic device 10 to work. The temperature sensor 404 is used for sensing the temperature of elements of the electronic device 10, for example, elements installed in the electronic device 10. The controller 406 is used for driving the driving devices 300 according to the sensed temperature, so as to cause the supporting members 108 to move a predetermined distance along a direction substantially perpendicular to the bottom of the main body 100.

Figure 6:
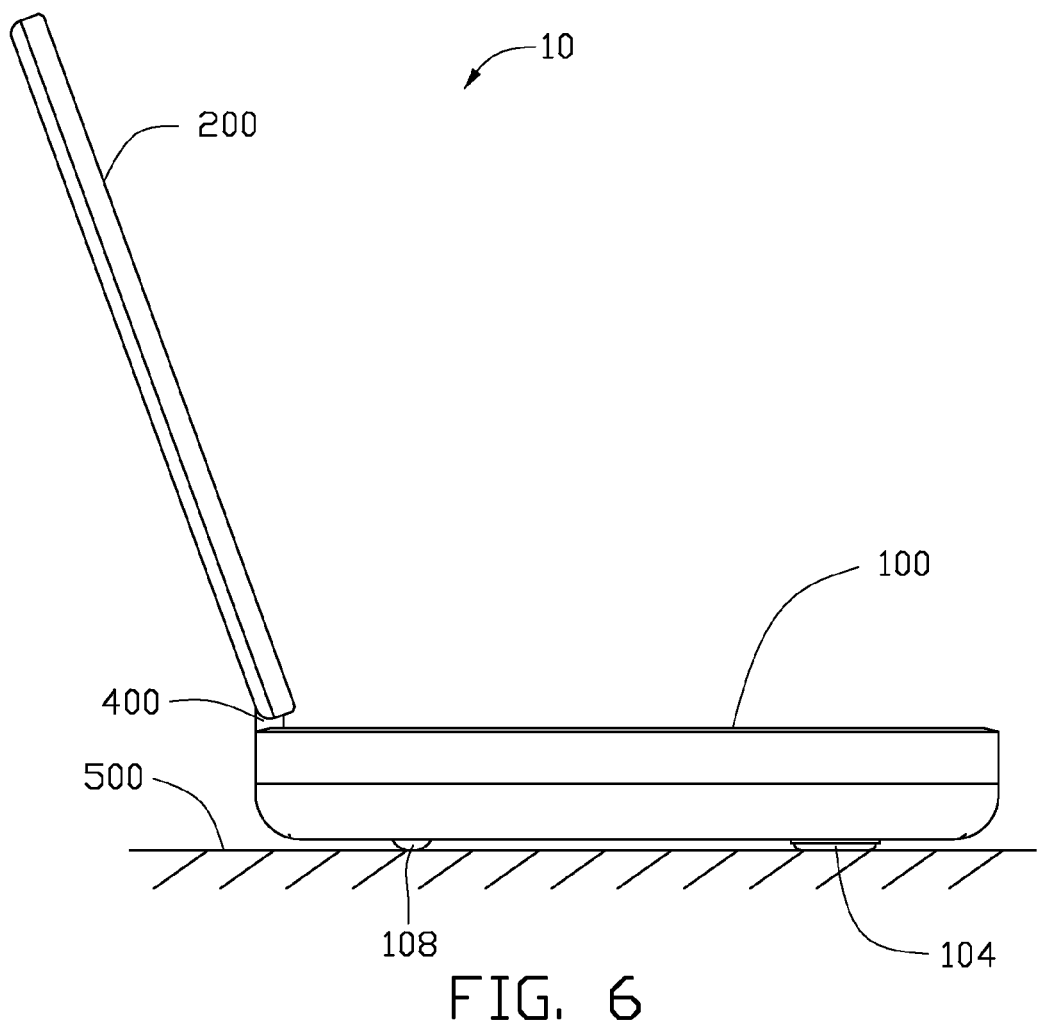
FIG. 6 is a schematic view of the electronic device of FIG. 1, with the electronic device in a flat state.
Figure 7:
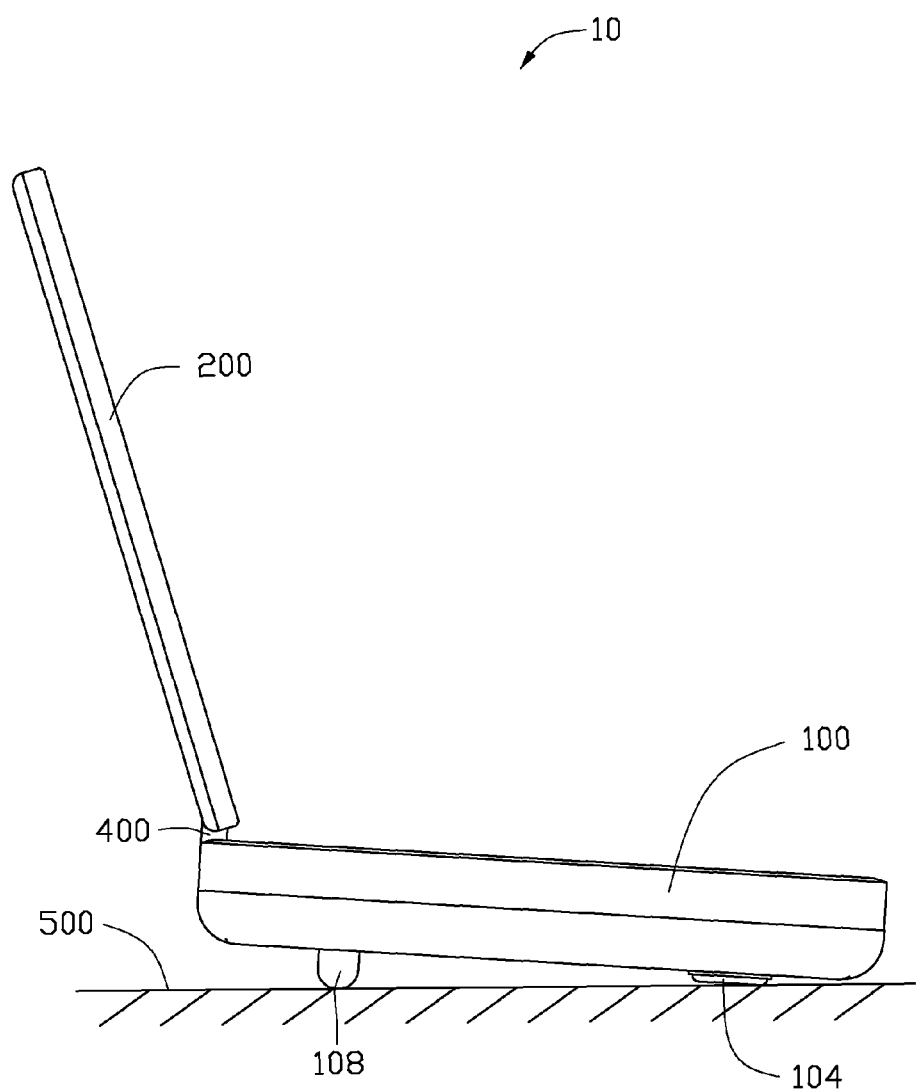
FIG. 7 is another schematic view of the electronic device of FIG. 1, with the electronic device in an inclined state.

Referring also to FIGS. 6-7, in FIG. 6, the electronic device 10 is in a flat state when laid on a surface 500 of an apparatus such as a desk (see FIG. 6), that is, the height of the protruded end of each of the supporting posts 108 is generally equal to that of the feet 104. In FIG. 7, if the sensed temperature exceeds the predetermined value, the controller 406 drives the driving device 300, so as to cause the supporting members 108 to move the predetermined distance downwards along the direction substantially perpendicular to the bottom of the main body 100. That is, the height of the protruded end of each of the supporting members 108 is greater than that of the feet 104, and the electronic device 100 is positioned in an inclined state (see FIG. 7). In the inclined state, the distance between the bottom of the main body 100 and the surface 500 is greater than when in the flat state, thus the heat dissipation of the electronic device 100 correspondingly increases. In the inclined state, if the sensed temperature is equal to or below the predetermined value, the controller 406 drives the driving devices 300, so as to cause the supporting members 108 to move the predetermined distance upwards along the direction substantially perpendicular to the bottom of the main body 100. That is, the electronic device 10 returns to its flat state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with a heat dissipation mechanism, comprising:
   a main body defining a plurality of heat dissipation holes and at least one through hole, wherein the heat dissipation holes are configured for dissipating heat of the electronic device;
   at least one supporting member corresponding to and passing through the at least one through hole, wherein one end of each of the at least one supporting member protrudes from a bottom of the main body via a corresponding one of the at least one through hole;
   at least one driving device configured for driving the at least one supporting member to move along a direction substantially perpendicular to the bottom of the main body, causing the electronic device to be positioned in a flat state or in an inclined state;
   a temperature sensor configured for sensing the temperature of the electronic device; and
   a controller configured for driving the driving device, causing the at least one supporting member to move a predetermined distance along the direction substantially perpendicular to the bottom of the main body, according to the sensed temperature.

2. The electronic device as described in claim 1, wherein if the sensed temperature is greater than a predetermined temperature, the driving device controls the at least one supporting member to move the predetermined distance, causing the electronic device to be positioned in the inclined state.

3. The electronic device as described in claim 2, wherein when the electronic device is in the inclined state, if the sensed temperature is equal to or below the predetermined temperature, the driving device controls the supporting member to move the predetermined distance, causing the electronic device to resume its flat state.

4. The electronic device as described in claim 1, wherein each of the at least one driving device comprises a transmission device and a motor, the transmission device engages with the at least one supporting member and converts the motion of the motor to the movement of the supporting member.

5. The electronic device as described in claim 4, wherein a plurality of engaging teeth protrudes from the sidewall of each of the at least one supporting member, the transmission device is a gear box, and the engaging teeth of the at least one supporting member engage with the gear of the transmission device.

6. The electronic device as described in claim 1, wherein the main body defines two through holes spaced from each other, and each of the through holes receives one supporting member.

7. The electronic device as described in claim 6, wherein the electronic device comprises two driving devices, and each of the driving devices drives one supporting member.

8. The electronic device as described in claim 1, wherein at least one foot is disposed on the bottom of the main body, the at least one foot cooperates with the at least one supporting member to support the electronic device.

9. The electronic device as described in claim 8, wherein when the electronic device is in the flat state, the height of the protruded end of each of the at least one supporting member is equal to that of the at least one foot; and when the electronic device is in the inclined state, the height of the protruded end of each of the at least one supporting member is larger than that of the at least one foot.

* * * * *